United States Patent [19]

Ceska et al.

[11] Patent Number: 4,997,498

[45] Date of Patent: Mar. 5, 1991

[54] PROPELLANT WITH THERMOPLASTIC ELASTOMER BINDER COMPOSED OF MACROMOLECULAR BLOCK WITH ALKOXYALKYL ACRYLATE TERMINATION

[75] Inventors: Gary W. Ceska, Exton; C. Richard Costin, West Chester; Thomas W. Hazell, Swarthmore; Robert G. Leclerc, Malvern, all of Pa.

[73] Assignee: Sartomer Company, Inc., Exton, Pa.

[21] Appl. No.: 448,348

[22] Filed: Dec. 11, 1989

Related U.S. Application Data

[62] Division of Ser. No. 297,132, Jan. 17, 1989.

[51] Int. Cl.$^5$ ............................................. C06B 45/10
[52] U.S. Cl. ................................. 149/19.91; 525/303
[58] Field of Search ...................... 149/19.91; 525/303

[56] References Cited

U.S. PATENT DOCUMENTS

| | | | |
|---|---|---|---|
| 3,214,306 | 10/1965 | Colichman et al. | 149/19.91 |
| 3,492,952 | 8/1969 | D'Alelio | 149/19.92 |
| 3,662,802 | 5/1972 | Bedell | 149/19.91 |
| 3,786,116 | 1/1974 | Milkovich et al. | 260/885 |
| 3,928,255 | 12/1975 | Milkovich et al. | 521/62 |
| 4,050,968 | 9/1977 | Goldhagen et al. | 149/19.91 |
| 4,056,416 | 11/1977 | Franklin et al. | 149/19.91 |
| 4,343,664 | 8/1982 | Iyer | 149/19.91 |
| 4,521,260 | 6/1985 | Johnson et al. | 149/19.91 |

*Primary Examiner*—Edward A. Miller
*Attorney, Agent, or Firm*—Young, Lewis J.; James A. Drobile; Raymond G. Arner

[57] ABSTRACT

Thermoplastic elastomers made by copolymerizing macromolecular monomers with alkoxyalkyl acrylates serve as binders for solid propellants which binders have high burn rates and increased insensitivity over conventional binders. The preferred alkoxyalkyl acrylate is methoxyethyl acrylate.

4 Claims, No Drawings

PROPELLANT WITH THERMOPLASTIC ELASTOMER BINDER COMPOSED OF MACROMOLECULAR BLOCK WITH ALKOXYALKYL ACRYLATE TERMINATION

This is a division of application Ser. No. 297,132, filed Jan. 17, 1989 pending.

BACKGROUND OF THE INVENTION

The present invention is directed to a composition of matter comprising copolymers of macromolecular monomers and alkoxyalkyl acrylates and their use as binders for solid propellants with high burn rates and increased insensitivity over conventional binders.

It is known that thermoplastic elastomers can be used as binders for the energetic materials in solid propellants. It is also known that thermoplastic elastomers based on block copolymers of styrene and butadiene or isoprene exhibit greater shock insensitivity than the crosslinked binders that are currently used in solid propellants.

The macromolecular monomers of this invention are primarily those taught by Milkovich et al, U.S. Pat. No. 3,786,116, which is hereby incorporated in its entirety into this application. Copolymer compositions comprising the macromolecular monomers and alkyl acrylates are also taught in this patent.

U.S. Pat. No. 3,928,255, also incorporated herein by reference, teaches hydrophilic copolymers made from macromolecular monomers and either hydroxyalkyl acrylates or hydroxyalkoxyalkyl acrylates.

BRIEF SUMMARY OF THE INVENTION

We have now found that certain copolymers of macromolecular monomers and certain alkoxyalkyl acrylate monomers, especially methoxyethyl acrylate, when used as binders for the energetic materials in solid propellants, exhibit increased shock insensitivity and increased thermal insensitivity, high burn rate and excellent wetting of the energetic material.

DETAILED DESCRIPTION OF THE INVENTION

The thermoplastic elastomers of the invention are made by copolymerizing macromolecular monomers with alkoxyalkyl acrylates in solvent under a nitrogen purge. The range of copolymer molecular weight formed is from 150,000 to 1,000,000. The composition of the copolymer ranges from 5 to 50 percent macromolecular monomer.

The alkoxyalkyl acrylates useful for copolymerizing with the macromolecular monomers are specifically alkoxyethyl acrylates, and more specifically methoxyethyl acrylate. The methoxyethyl acrylate appears to have the desired oxygen content to facilitate burning of the energetic material in solid propellants.

The macromolecular monomers are prepared by anionic polymerization of one or more vinyl aromatic compounds in the presence of a lithium-based initiator such as lithium metal, alkyl lithium compounds, aryl lithium compounds or mixtures thereof. The preferred initiators are alkyl lithium compounds such as the lower alkyl lithium compounds. The preferred initiator is sec-butyl lithium. Typical of the vinyl aromatic compounds useful in the macromolecular monomers are styrene, alpha-methylstyrene, nuclear-methylstyrene, indene, and p-tert-butylstyrene. Mixtures of two or more of these may be used if desired. The polymeric anion is then terminated with a compound which provides an addition polymerizable end group, such as acryloyl or methacryloyl chloride. The molecular weight distribution of the macromolecular monomers may range up to 3 or more, preferably up to about 2.

Since in some cases the polymeric anion resulting from the anionic polymerization is highly reactive and nonselective in reaction with a terminating agent which incorporates an addition polymerizable group into the macromolecular monomer, resulting in polymer chains having undesired functionality and molecular weight, the "living polymer" can be made less reactive by capping the polymeric anion with a less reactive end group prior to termination. Suitable capping agents include lower alkylene oxides or sulfides, such as ethylene and propylene oxide or sulfide.

The range of molecular weight of macromolecular monomer used is from 3,000 to 50,000. The mole ratio of monomer to initiator is generally high, such as 500 to 1. Azo, peroxide, and percarbonate initiators can be used for the copolymerization.

The solvents used for polymerization may be any of the known solvents, especially ethyl acetate, cyclohexane, toluene, or a mixture of these solvents. The copolymerization is run at 30 to 50 percent solids and 45° to 85° C. depending upon the desired copolymer molecular weight and the initiator system. The time of polymerization is adjusted so that the acrylate monomer is greater than 95% converted to copolymer.

The solid oxidizers useful in the propellants are employed in powdered form and include the nitrates, perchlorates, chlorates, permanganates, chromates, and dichromates of the alkali or alkaline earth metals, ammonia, hydrazine, or guanidine. Examples of the solid oxidizers are ammonium nitrate, ammonium perchlorate, sodium nitrate, potassium perchlorate, lithium chlorate, calcium nitrate, barium perchlorate, strontium chlorate, and the like, with ammonium perchlorate being preferred. Also useful for this purpose are the cyclic nitramines such as cyclotrimethylenetrinitramine and cyclotetramethylenetetranitramine.

The propellant also preferably includes a solid fuel component in powdered form. Examples of these are metals such as aluminum, boron, magnesium, and beryllium; metal alloys such as the aluminum alloys of boron, magnesium, manganese, zinc, and copper; metal hydrides such as the hydrides of aluminum and beryllium. These solid fuels are used in concentrations consistent with good mixing characteristics (usually between about 2 and 30 weight percent of the propellant composition).

The propellant composition may also include other conventional propellant ingredients such as antioxidants, wetting agents, metal oxides, reinforcing agents, burning rate catalysts, resonance suppressors, and the like. These additives usually comprise 10% or less of the propellant composition.

The following example is meant to further illustrate but not to limit the invention.

EXAMPLE I

A resin reactor was charged with 1787.5 g of ethyl acetate and agitation begun. To the reactor was added 144.4 g of a 30,000MW macromolecular monomer of polystyrene capped with methacrylate and the reactor was heated to 50° C. until the monomer was completely dissolved. The reactor was then cooled to 25° C. and a mixture of 818.1 g of methoxyethyl acrylate and 2.07 g of azobisisobutyronitrile was added. After purging the reactor with nitrogen, the mixture was heated to 69° C. and maintained at that temperature for 16 hours. The copolymer solution obtained was 34.2 % solids. The peak molecular weight obtained by GPC was 632,000 and the weight average molecular weight was 830,000 for the copolymer. The conversion of macromolecular monomer was 90.3% and of the acrylate monomer was 97.3%. The devolatilized copolymer was non-tacky and exhibited rubber-like properties.

Use of the copolymer as binder in a rocket propellant mixture showed great improvement in the rate of burning and in the insensitivity to shock and the wetting of the energetic material.

We claim:

1. A solid propellant of the composite type comprising from about 45 to 95 weight percent of a solid oxidizer and from 5 to 55 weight percent of a copolymer binder consisting essentially of 5 to 50 weight percent of a macromolecular monomer comprising poly(vinyl aromatic compound) of weight average molecular weight of 3,000-50,000 and having a polymerizable end group and 50 to 95 weight percent of methoxyethyl acrylate.

2. The propellant of claim 1 further comprises 2-30 wt. % of a solid fuel component.

3. The propellant of claim 1 wherein said solid oxidizer is selected from the group consisting of the nitrates, perchlorates, chlorates, permanganates, chromates, and dichromates of the alkali or alkaline earth metals, ammonia, hydrazine or quanidine and the cyclic nitramines.

4. The propellant of claim 2 wherein the solid fuel component is selected from the group consisting of metals, metal allows, and metal hydrides.

* * * * *

UNITED STATES PATENT AND TRADEMARK OFFICE
CERTIFICATE OF CORRECTION

PATENT NO. : 4,997,498

DATED : March 5, 1991

INVENTOR(S) : Gary W. Ceska, C. Richard Costin, Thomas W. Hazell and Robert G. Leclerc It is certified that error appears in the above-identified patent and that said Letters Patent is hereby corrected as shown below:

Column 2, line 42, "cyclotetramethylenetetranitramine" should read -- cyclotetramethylene tetranitramine --.

In the claims: Column 4, line 13, "quanidine" should read -- guanidine --.

Signed and Sealed this

Fifteenth Day of September, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,997,498
DATED : March 5, 1991
INVENTOR(S) : Gary W. Ceska, et. al.

It is certified that error appears in the above-indentified patent and that said Letters Patent is hereby corrected as shown below:

Column 2, line 41, "cyclotrimethylenetrinitramine" should read -- cyclotrimethylene trinitramine --.

Column 2, line 65, "30,000MW" should read -- 30,000 MW --.

Column 4, line 17, "allows" should read -- alloys --.

Signed and Sealed this

Seventeenth Day of August, 1993

Attest:

BRUCE LEHMAN

*Attesting Officer*  *Commissioner of Patents and Trademarks*